Oct. 21, 1952 P. H. SHERRON 2,614,664

TELEPHONE BOOTH

Filed March 25, 1948 2 SHEETS—SHEET 1

INVENTOR.
PERCIVAL H. SHERRON
BY
Busser + Harding
ATTORNEYS

TELEPHONE BOOTH

Filed March 25, 1948 2 SHEETS—SHEET 2

INVENTOR.
PERCIVAL H. SHERRON
BY Bussert Harding
ATTORNEYS

Patented Oct. 21, 1952 2,614,664

UNITED STATES PATENT OFFICE 2,614,664

TELEPHONE BOOTH

Percival H. Sherron, Jamaica, N. Y.

Application March 25, 1948, Serial No. 16,949

4 Claims. (Cl. 189—2)

This invention relates to an improved telephone booth of the so-called stall type. In particular it relates to the novel construction of the elements used in the assembly of such a telephone booth.

An object of this invention is to provide a telephone booth having structural elements which can be fabricated easily and rapidly and which can be readily assembled to form a strong structure.

An additional object of this invention is to provide a telephone booth having a small number of individual parts without any sacrifice of structural strength.

A further object of this invention is to provide a telephone booth comprising elements which may be assembled by interlocking, thus eliminating bolting, riveting, welding and similar securing means.

In general, the telephone booth in accordance with this invention comprises a base, corner posts, wall sections, a lintel and a roof. These units or elements may be easily fabricated from, for example, sheet metal, plastics and acoustic material. Assembly may be accomplished rapidly since the units or elements interlock to form a booth of rigid construction. The use of bolts and similar securing devices is dispensed with.

These and other objects will become apparent by reading the description of a preferred embodiment of the invention in conjunction with the drawings, in which.

Figures 1, 2, 3, 4, 5, 6, 7, 8, 9, 16:
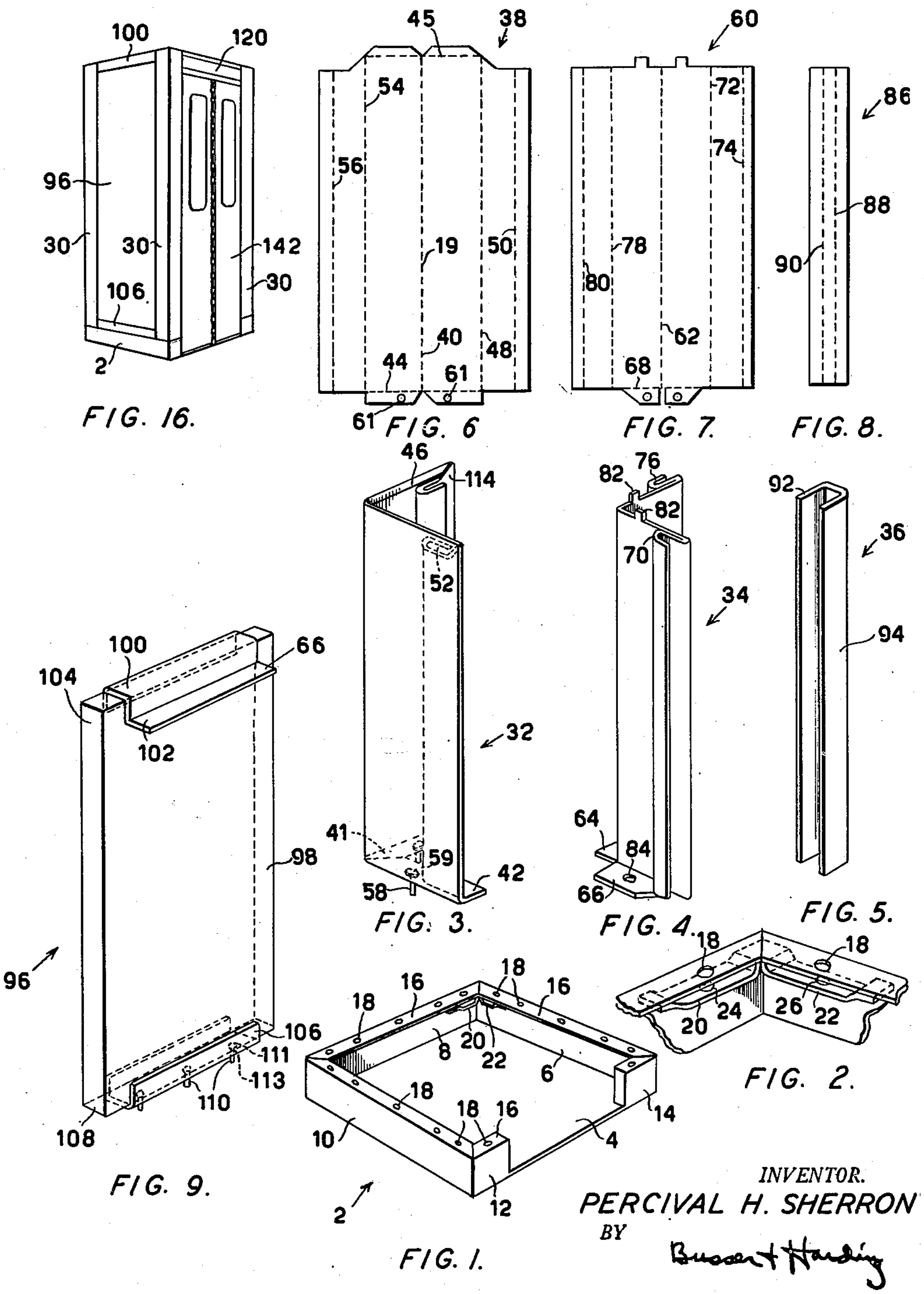
Figure 1 is a perspective view of the base.
Figure 2 is a partial perspective view of the base showing a corner thereof.
Figure 3 is a perspective view of the outer member of a corner post.
Figure 4 is a perspective view of the inner member of a corner post.
Figure 5 is a perspective view of a channel member of a corner post.
Figure 6 is an elevation of a blank from which the outer member of a corner post is formed.
Figure 7 is an elevation of a blank from which the inner member of a corner post is formed.
Figure 8 is an elevation of a blank from which the channel member of a corner post is formed.
Figure 9 is a perspective view of a panel member.
Figure 16 is a perspective view of a completely assembled telephone booth.
Figures 10, 11, 12, 13, 14, 15:
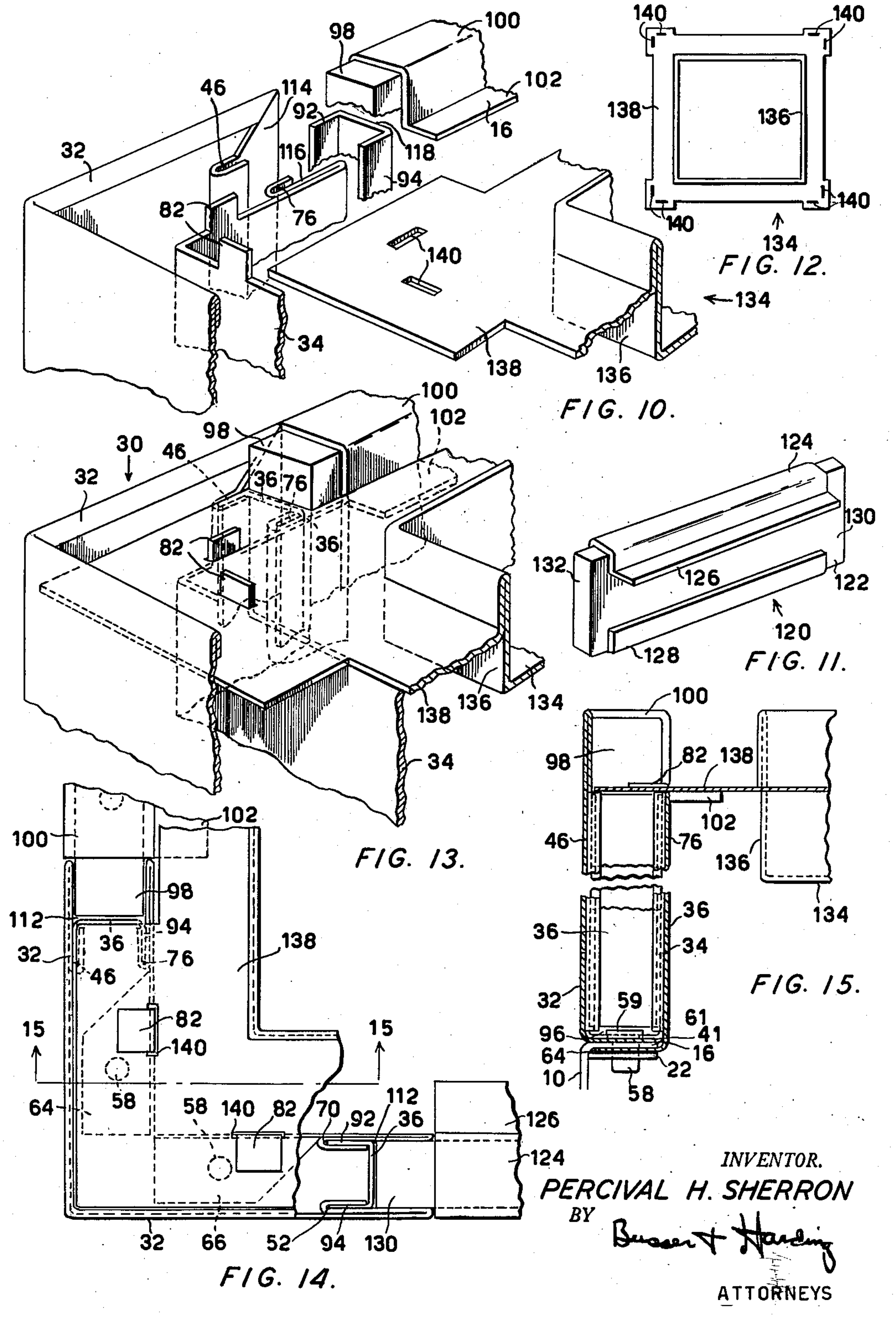
Figure 10 is a perspective view showing disassembled the upper portion of one corner of the telephone booth.
Figure 11 is a perspective view of the lintel.
Figure 12 is a plan view of the roof before it is placed on the booth.
Figure 13 is a perspective view of the upper portion of a corner of the telephone booth after assembly.
Figure 14 is a plan view of a front corner of the telephone booth.
Figure 15 is a section taken on the plane at the line 15—15 in Figure 14.

A base 2 formed from a sheet metal blank has a floor 4 and walls 6, 8, 10, 12 and 14, all of which are bent inwardly to form flange 16. Flange 16 has openings 18 for the reception of pins. Straps 20 and 22 are secured to the underside of flange 16 in each corner of the base. Strap 20 has an opening 24 and strap 22 has an opening 26. Openings 24 and 26 are in register with a pair of openings 18 in the flange 16.

Corner posts 30 are four in number and identical. Each corner post 30 comprises an outer member 32, an inner member 34 and a pair of channel members 36.

The outer member 32 is formed from a blank 38 shown in Figure 6. The blank is bent ninety degrees along the line indicated by the dotted line 40. Flanges 41 and 42 are formed by bending the blank along the line indicated by dotted line 44. The blank is bent back on itself by bending one hundred and eighty degrees along the dotted line indicated at 45. A U-shaped slot 46 is formed by bending along the dotted lines 48 and 50. A similar U-shaped slot 52 is formed by bending the blank along the dotted lines 54 and 56. Pins 58 having heads 59 are then forced into openings 61 in flanges 41 and 42.

Inner member 34 is formed from blank 60 which is first bent ninety degrees along the line indicated by dotted line 62. Flanges 64 and 66 are made by bending along the dotted line 68. A U-shaped opening 70 is formed by bending the blank along the dotted lines 72 and 74. Similarly a U-shaped opening 76 is formed by bending along the dotted lines 78 and 80. Inner member 34 has two vertical tongues 82 and openings 84 in flanges 64 and 66.

Channel member 36 is formed by bending blank 86 along the lines indicated by dotted lines 88 and 90, thus forming parallel sides 92 and 94.

Each corner post 30 is assembled and secured to base 2 by first placing flanges 64 and 66 of inner member 34 on straps 20 and 22 of the base 2. The outer member 32 is then placed on flange 16, the pins 58 seating in base flange openings 18, openings 84 in flanges 64 and 66 and in openings 24 and 26 in the straps. Sides 92 and 94 of a channel member 36 are then forced into openings 46 and 76 and similarly the sides of a second channel member are forced into the slots 52 and 70 to complete the assembly of each corner post with the base.

As in the case of the corner posts all the panel members 96 which form the sides and rear of the telephone booth are identical. Each panel member 96 comprises a box-like structure 98 which may be formed, for example, by welding sheet metal plates together or may be formed of a solid block of plastic or sound absorbent material. A channel 100 with a flange 102 on the interior side of the panel member is secured by a forced fit to the top portion 104 of the panel member. A channel member 106 is secured by a forced fit to the lower portion 108 of the panel member. Vertical pins 110, having heads 111, are secured by a forced fit in openings 113.

The corner posts 30 being assembled and secured to the base 2, a panel member 96 may be secured to the telephone booth at each side and at the rear. Each panel member is secured to the adjacent corner posts by sliding the panel member into slots 112 which, when the corner posts are assembled, are formed between the interior surfaces 114 and 116 of the exterior member 32 and the interior member 34 and have a depth determined by the rear surface 118 of channel member 36. The lower portion 108 rests on flange 16 of the base 2. Pins 110 fit into openings 18 in base flange 16.

A lintel 120 comprises a box-like structure 122 which may be formed of sheet metal plates welded together or it may be a solid structure of sound absorbing material. A channel member 124 is secured by a tight fit to the top portion of structure 122. The channel member 124 has a flange 126 on the interior side of the lintel. A channel member 128 is secured by a tight fit to the lower portion of structure 122.

The lintel 120 is secured to the telephone booth structure by sliding ends 130 and 132 of the lintel into the slots 112 in the adjacent corner posts 30 to a position where the lintel flange 126 lies in the same plane with panel member flanges 102.

The final portion of the structure to be added is a roof 134. The roof has a vertical upstanding flange 136 and a horizontal flange 138. The flange 138 has openings 140 for the reception of tongues 82 on member 34.

On assembling the roof with the telephone booth structure, the flange 138 is supported by corner post 30, flanges 102 and flange 126. Tongues 82 pass through openings 140. These tongues are bent down against flange 138.

The completely assembled telephone booth (Figure 16) may have a double leaf door 142 installed in a conventional manner such as, for example, in the manner shown in my prior Patent 2,208,166, issued July 16, 1940.

What I claim and desire to protect by Letters Patent is:

1. A telephone booth having a base with upstanding sides and an inwardly extending flange, a plurality of panels mounted on the base flange, a plurality of corner posts forming with said panels the walls of said booth, each of said corner posts comprising a pair of spaced apart members forming inner and outer corner elements, a flange formed at the lower end of each of said corner elements, downwardly extending pins secured to the flanges of said outer corner elements, straps secured to the under side of said base flange adjacent the corners of the base, the flanges of the inner corner elements being engaged between said straps and th base flange, the flanges of the outer corner elements resting on the base flange and the pins secured to said outer element flanges passing through registering openings in the base flange, the inner corner element flanges and the straps respectively, removable means above the base flange securing each pair of inner and outer corner elements together, each side of the panel members being in engagement with a corner post and a roof secured to said corner posts.

2. A telephone booth having a base with upstanding sides and an inwardly extending flange, a plurality of panels mounted on the base, a plurality of corner posts forming with said panels the walls of said booth, each of said corner posts comprising a pair of spaced apart members forming inner and outer corner elements, each of said elements formed from a single piece of material and having a bent back portion adjacent each upstanding edge, each bent back portion having an outwardly facing upstanding groove adjacent its inner edge, a channel shaped member located between each oppositely disposed pair of bent back portions and engaged in said outwardly facing grooves in the bent back portions, each of said oppositely disposed pairs of bent back portions together with the engaged channel shaped member forming an upstanding panel groove, straps secured to the under side of the base flange and adjacent the corners of the base, flanges on the lower ends of said inner corner elements engaged between the base flange and said straps, flanges on the lower ends of said outer corner elements, downwardly extending pins secured to said outer element flanges, said outer element flanges resting on the base flange and said pins passing through registering openings in the base flange, in the flanges of the inner corner elements and in said straps, said panel members being disposed between said corner posts and engaging said panel grooves and a roof secured to said corner posts.

3. A telephone booth having a base, a plurality of panels mounted on the base, a plurality of corner posts mounted on the base and forming with said panels the walls of said booth, each of said corner posts comprising a pair of spaced apart members forming inner and outer corner elements, each of said elements formed from a single piece of material and having a bent back portion adjacent each upstanding edge, each bent back portion having an outwardly facing upstanding groove adjacent its inner edge, a channel shaped member located between each oppositely disposed pair of bent back portions and engaged in said outwardly facing grooves in the bent back portions, each of said oppositely disposed pairs of bent back portions together with the engaged channel shaped member forming an upstanding panel groove, said panel members being disposed between said corner posts and having their upstanding edges engaged in said panel grooves, an inwardly extending flange secured to each panel member below the top thereof, a roof resting on said flanges and on the inner corner elements, said inner corner elements having tongues passing through slots in the roof and said roof abutting against the inner faces of said panel members.

4. A telephone booth having a base with upstanding sides and an inwardly extending flange, a plurality of panels mounted on the base, a plurality of corner posts forming with said panels the walls of said booth, each of said corner posts comprising a pair of spaced apart members forming inner and outer corner elements, each of said elements formed from a single piece of material and having a bent back portion adjacent each upstanding edge, each bent back portion having an outwardly facing upstanding groove adjacent its inner edge, a channel shaped member located between each oppositely disposed pair of bent back portions and engaged in said outwardly facing grooves in the bent back portions, each of said oppositely disposed pairs of bent back portions together with the engaged channel shaped member forming an upstanding panel groove, straps secured to the under side of the base flange and adjacent the corners of the base, flanges on the lower ends of said inner corner elements engaged between the base flange and said straps, flanges on the lower ends of said outer corner elements, downwardly extending pins secured to said outer element flanges, said outer element flanges resting on the base flange and said pins passing through registering openings in the base flange, in the flanges of the inner corner elements and in said straps, said panel members being disposed between said corner post and having their upstanding portions engaged in said panel grooves, pins secured to the bottom of a plurality of said panel members and engaging registering openings in the base flange and a roof secured to said corner posts.

PERCIVAL H. SHERRON.

REFERENCES CITED

The following references are of record in the file of this patent:

UNITED STATES PATENTS

| Number | Name | Date |
|---|---|---|
| 296,244 | Perkins | Apr. 8, 1884 |
| 2,043,174 | Jacobson | June 2, 1936 |
| 2,143,288 | Stolz | Jan. 10, 1939 |
| 2,144,406 | Gunter | Jan. 17, 1939 |
| 2,229,775 | Sherron | Jan. 28, 1941 |
| 2,313,471 | Hallam | Mar. 9, 1943 |
| 2,349,144 | Corso | May 16, 1944 |